US008891442B2

(12) United States Patent
Lan

(10) Patent No.: US 8,891,442 B2
(45) Date of Patent: Nov. 18, 2014

(54) APPARATUS AND METHOD FOR DUAL-MODE OPERATION

(75) Inventor: Wei-Ming Lan, Morrisville, NC (US)

(73) Assignee: Clearwire IP Holdings LLC, Bellevue, WA (US)

( * ) Notice: Subject to any disclaimer, the term of this patent is extended or adjusted under 35 U.S.C. 154(b) by 922 days.

(21) Appl. No.: 12/495,154

(22) Filed: Jun. 30, 2009

(65) Prior Publication Data

US 2010/0329181 A1 Dec. 30, 2010

(51) Int. Cl.
 *H04W 4/00* (2009.01)
 *H04W 48/18* (2009.01)
 *H04W 88/06* (2009.01)
 *H04W 4/02* (2009.01)

(52) U.S. Cl.
 CPC .............. *H04W 48/18* (2013.01); *H04W 88/06* (2013.01); *H04W 4/02* (2013.01)
 USPC ........... 370/328; 370/331; 370/332; 370/338; 370/389; 455/419; 455/440; 455/456.3

(58) Field of Classification Search
 USPC ........................................................ 370/328
 See application file for complete search history.

(56) References Cited

U.S. PATENT DOCUMENTS

| 5,452,471 | A | 9/1995 | Leopold et al. ............... 455/12.1 |
| 7,356,340 | B2 * | 4/2008 | Hamilton ....................... 455/446 |
| 7,492,752 | B2 | 2/2009 | Harris et al. ................... 370/342 |
| 7,953,048 | B2 | 5/2011 | Yoon et al. ..................... 370/335 |
| 8,285,291 | B2 | 10/2012 | Dinan et al. .................... 455/443 |
| 8,396,039 | B2 | 3/2013 | Pawar et al. ................... 370/331 |
| 2004/0165563 | A1 * | 8/2004 | Hsu et al. ....................... 370/338 |
| 2004/0242240 | A1 * | 12/2004 | Lin .............................. 455/456.3 |
| 2006/0092872 | A1 * | 5/2006 | Lee et al. ........................ 370/328 |
| 2007/0042781 | A1 | 2/2007 | Yavuz et al. ................... 455/445 |
| 2007/0127407 | A1 | 6/2007 | Attar et al. ..................... 370/318 |
| 2007/0167174 | A1 * | 7/2007 | Halcrow et al. ............. 455/456.2 |

(Continued)

FOREIGN PATENT DOCUMENTS

| WO | WO 2009/053933 | 4/2009 |
| WO | WO 2009053933 A1 * | 4/2009 |

OTHER PUBLICATIONS

International Search Report and Written Opinion for PCT/US2010/040091 mailed Sep. 1, 2010, 15 pages.

(Continued)

*Primary Examiner* — Ayaz Sheikh
*Assistant Examiner* — Hai-Chang Hsiung

(57) ABSTRACT

A system, computer-readable medium, and method of operating a dual-mode WiMAX and CDMA communications device capable of operating in a CDMA mode or a WiMAX mode includes receiving a first base station (BS) location message from the BS and storing the received location as a current BS location. The BS location is compared to stored region coordinates for the different regions, and the comparison is used to determine a particular region in which the dual-mode device is currently located. Analysis determines whether a WiMAX market is located within the particular region. If no WiMAX markets are located, the dual-mode device is operated in the CDMA mode. If one or more WiMAX markets are located within the particular region, a determination is made as to whether the BS location is within a WiMAX market and, if so, the dual-mode device is placed in a WiMAX mode of operation. Battery power is conserved by avoiding WiMAX transmission when WiMAX service is not available at the current BS location.

55 Claims, 4 Drawing Sheets

(56) References Cited

U.S. PATENT DOCUMENTS

Figure 1:
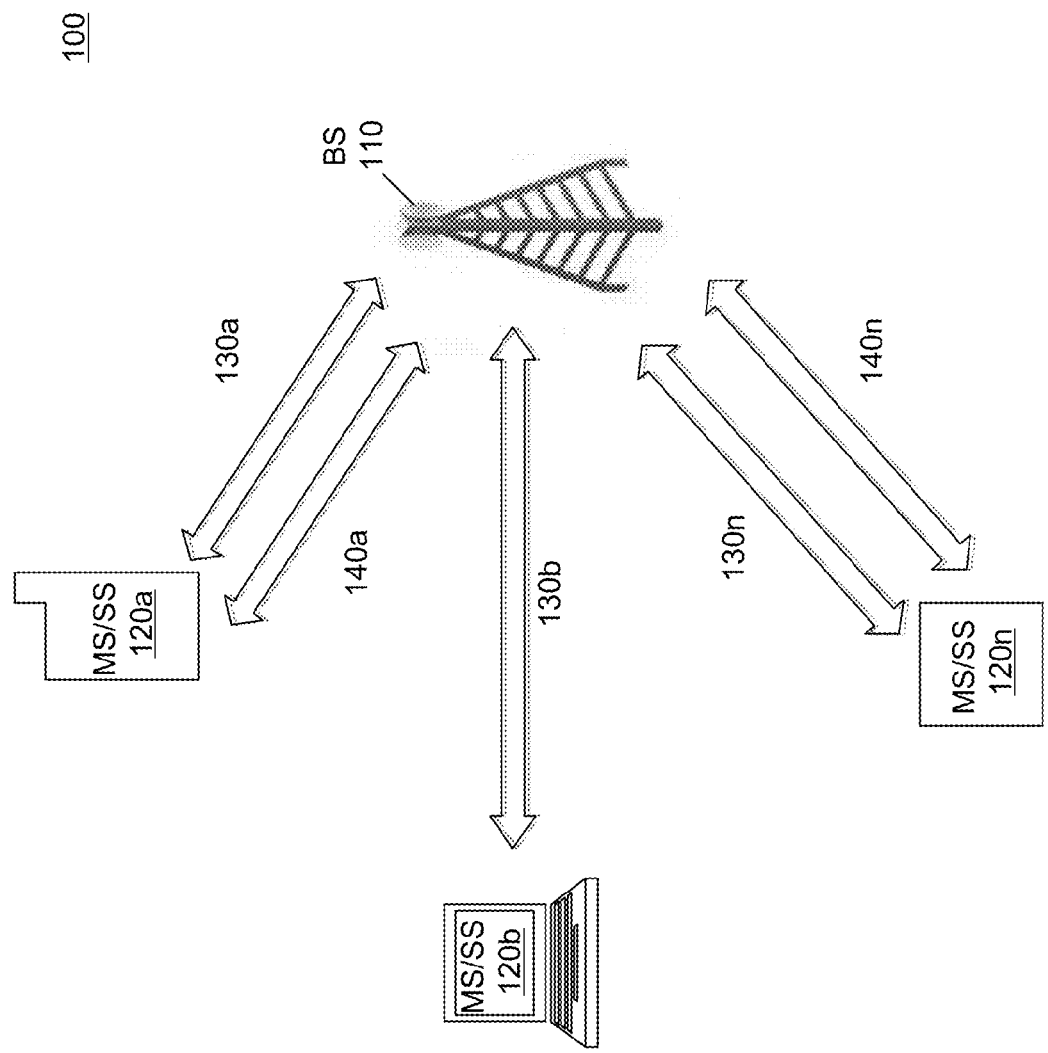

| | | | |
|---|---|---|---|
| 2008/0076430 A1* | 3/2008 | Olson | 455/440 |
| 2008/0248800 A1* | 10/2008 | Jalloul | 455/433 |
| 2009/0052399 A1* | 2/2009 | Silver et al. | 370/331 |
| 2009/0067628 A1 | 3/2009 | Pudney et al. | |
| 2009/0111458 A1 | 4/2009 | Fox et al. | |
| 2009/0113543 A1 | 4/2009 | Adams et al. | |
| 2010/0248708 A1 | 9/2010 | Koivisto et al. | 455/419 |
| 2011/0189997 A1 | 8/2011 | Tiwari et al. | |
| 2011/0255516 A1 | 10/2011 | Pawar et al. | |
| 2013/0059591 A1 | 3/2013 | Tiwari et al. | 455/443 |
| 2014/0024373 A1 | 1/2014 | Pawar et al. | 455/436 |

OTHER PUBLICATIONS

International Preliminary Report on Patentability for PCT/US2010/040091 mailed Nov. 30, 2011, 29 pages.

* cited by examiner

APPARATUS AND METHOD FOR DUAL-MODE OPERATION

BACKGROUND

This disclosure is generally related to Code Division Multiple Access (CDMA) and Worldwide Interoperability for Microwave Access ("WiMAX") technologies. In one or more embodiments, this disclosure is directed to a system and method useful for improving the utilization of WiMAX systems that operate with dual-mode WiMAX/CDMA devices, in particular, dual-mode WiMAX/CDMA devices operating in an Evolution-Data Optimized or Evolution-Data only ("EV-DO")/CDMA and WiMAX overlay networks.

EVDO, or Evolution Data Only/Evolution Data Optimized, is a 3G mobile broadband technology used by various wireless carriers such as Verizon, Sprint, and Alltel that provides typical speeds of 600-1400 kbps download (with bursts up to 2000 kbps) and 500-800 kbps upload by wireless transmission. EVDO is a telecommunications standard for the wireless transmission of data through radio signals, typically for broadband Internet access. The resulting Internet connection may be shared with multiple computers using a 3G router, similar to a conventional broadband connection. It is standardized by 3rd Generation Partnership Project 2 (3GPP2) as part of the CDMA2000 family of standards, and has been adopted by many mobile phone service providers around the world—particularly those previously employing CDMA networks.

WiMAX networks are not yet as widespread as CDMA and EDVO networks, however several conventional dual-mode WiMAX/CDMA devices exist. For such conventional WiMAX/CDMA dual-mode devices, the priority is always to look for the WiMAX system first. If a WiMAX system is not available, then the device looks for the EVDO system. If the EVDO system is not available, then the device looks for the CDMA system. Furthermore, such conventional dual-mode devices are required to return to the WiMAX system as soon as possible, if it is not currently served by a WiMAX system. As a result, some conventional dual-mode devices are required to constantly scan for a WiMAX system even if the device is receiving service from the EVDO or CDMA systems. Since current WiMAX coverage is minimal compared to currently available CDMA and EVDO coverage, there presently is a high likelihood that the device will waste processor time and battery drain to scan for the WiMAX system, which does not yet exist in most regions. Consequently, other conventional dual-mode devices are designed in such that the device must stay in the EVDO system and/or CDMA system once it moves outside WiMAX coverage, and does not allow return to the WiMAX system even if WiMAX becomes available thereafter. As a result, the device cannot take full advantage of the benefit that WiMAX networks have to offer in terms of data throughput and latency. Further, concern for battery life greatly limits the usability of the WiMAX system in conventional dual-mode devices, and therefore adversely impacts system performance and the user's experience.

What is needed is an apparatus and method that seamlessly allow a dual-mode CDMA/WiMAX device to transition between CDMA and WiMAX modes of operation. What is even further needed is an apparatus and method that allow a dual-mode CDMA/WiMAX device to seamlessly transition back and forth between CDMA and WiMAX modes of operation while reducing battery drain as compared to conventional dual-mode devices.

SUMMARY

The apparatus and method of this disclosure provide various features, functions, and capabilities as discussed more fully in the detailed description. For example, this disclosure provides a novel and useful apparatus and method for use in a communications system, with particular application in wireless telecommunication systems such as those adhering to IEEE 802.16 (WiMAX), 3GPP, 3GPP2, etc. communication standard specifications and/or communication standards for CDMA and EVDO. However, this disclosure is not necessarily limited to use with such systems and methods.

Various embodiments of this disclosure alert a WiMAX/CDMA dual-mode device as to the availability of WiMAX coverage when the device moves from CDMA-only area to the WiMAX and CDMA overlay area, and vice versa.

One or more embodiments of this disclosure rely on broadcast CDMA/EVDO cell site GPS coordinate information which is received by the WiMAX/CDMA dual mode device to determine if the dual-mode device is operating within WiMAX coverage area. Based on that information, a decision is made whether to search for a WiMAX system. By doing so, the system and method of this disclosure intelligently reduce the need to search for the WiMAX service when the WiMAX coverage is not available, and hence greatly reduces device power consumption due to frequency scanning and data processing requirements associated with WiMAX transition, and thereby extends the battery life.

Based on location information stored in a structured data base, for example, the dual-mode device will be able to either automatically switch to a WiMAX system when the device moves into a WiMAX coverage area, or WiMAX will be turned off, and a switched to a CMDA and/or EVDO communication service when the device leaves the WiMAX coverage area. By doing so, the device will also be able to greatly reduce the drain rate of the battery while outside a WiMAX coverage area by not repeatedly and blindly scanning for a WiMAX system. The teachings of this disclosure allow the user to take full advantage of WiMAX coverage while enjoying longer battery life in an automated and computer-controlled fashion using pre-provisioned location information regarding WiMAX service areas, as opposed to conventional practice in which human intervention is required to physically turn WiMAX or CDMA parts of the device ON or OFF.

In one or more embodiments, a methodology is disclosed that improves the network detection and selection process in CDMA/WiMAX dual-mode devices. In another embodiment, the methodology may be implemented in computer software and run on a CDMA/WiMAX dual-mode device. In aspects of various embodiments, the method and device of this disclosure are configured to support over-the-air (OTA) table data and executable software code upgrades in order to accommodate the expansion of WiMAX coverage in a timely manner as such markets grow.

In one embodiment, a method of operating a dual-mode WiMAX and CDMA communications device capable of operating in a CDMA mode or a WiMAX mode includes the steps of receiving, in the dual-mode device, a first base station (BS) location message via a CDMA network from a first BS, and storing the first BS location as a current BS location in a memory device operatively coupled to a processor arranged in the dual-mode device; comparing, using the processor, the stored first BS location to a plurality of region coordinates stored in the memory device and corresponding to a plurality of different regions; using the comparison result to determine a particular region of the plurality of different regions in which the dual-mode device is currently located; determining, using the processor, whether one or more WiMAX markets are located within the particular region, wherein, if no WiMAX markets are located within the particular region, operating the dual-mode device in the CDMA mode, wherein, if one or more WiMAX markets are located within the particular region, determining whether the stored first BS location is located within one of the one or more WiMAX markets and, in response to said determination, either placing the dual-mode device in a WiMAX mode of operation or placing the dual-mode device in the CDMA mode.

In another embodiment, a dual-mode WiMAX and CDMA communications apparatus capable of selectively operating in a CDMA mode or a WiMAX mode includes a processor; a memory device configured to store a region table comprising geographic information corresponding to a plurality of regions, a WiMAX coverage table comprising geographic information corresponding to one or more WiMAX markets, and a current base station (BS) location therein; a CDMA transceiver configured to transmit and receive information over a CDMA network; a WiMAX transceiver configured to selectively transmit and receive data over a WiMAX network; wherein the processor is configured to: receive and compare the current BS location with an updated BS location received over the CDMA network and, in response to said comparison, to determine a particular region in the plurality of regions in which the apparatus is currently operating, determine whether the particular region has one or more WiMAX markets associated therewith, determine whether the apparatus is currently operating within one of the WiMAX markets and, if the apparatus is currently operating within said one of the WiMAX markets, to cause the WiMAX transceiver to transmit and join a WiMAX network associated therewith.

In another embodiment, a computer-readable medium comprising computer readable code embodied thereon which, when executed by a processor arranged in a dual-mode WiMAX and CDMA communications device capable of operating in a CDMA mode or a WiMAX mode, causes the processor to carry out the functions of: receiving, in the dual-mode device, a first base station (BS) location message via a CDMA network from a first BS, and storing the first BS location as a current BS location in a memory device; comparing the stored first BS location to a plurality of region coordinates stored in the memory device and corresponding to a plurality of different regions; using the comparison result to determine a particular region of the plurality of different regions in which the dual-mode device is currently located; determining whether one or more WiMAX markets are located within the particular region, wherein, if no WiMAX markets are located within the particular region, operating the dual-mode device in the CDMA mode, wherein, if one or more WiMAX markets are located within the particular region, determining whether the stored first BS location is located within one of the one or more WiMAX markets and, in response to said determination, either placing the dual-mode device in a WiMAX mode of operation or placing the dual-mode device in the CDMA mode, wherein, if the dual-mode device is placed in the WiMAX mode of operation, setting a WiMAX camp flag.

In another embodiment, a method of operating a dual-mode WiMAX and CDMA communications device capable of operating in a CDMA mode or a WiMAX mode, wherein the method includes receiving, in a processor, a device position from a GPS receiver arranged in the dual-mode communications device; comparing the received device position with a plurality of region coordinates stored in a memory device operatively coupled to the processor and corresponding to a plurality of different regions; using the comparison result to determine a particular region of the plurality of different regions in which the dual-mode device is currently located; determining, using the processor, whether one or more WiMAX markets are located within the particular region, wherein, if no WiMAX markets are located within the particular region, operating the dual-mode device in the CDMA mode, wherein, if one or more WiMAX markets are located within the particular region, determining whether the received device position is located within one of the one or more WiMAX markets and, in response to said determination, either placing the dual-mode device in a WiMAX mode of operation or placing the dual-mode device in the CDMA mode.

In another embodiment, a memory for storing data for access by an application program being executed by a processor in a dual-mode WiMAX and CDMA communications apparatus capable of selectively operating in a CDMA mode or a WiMAX mode includes a data structure stored in said memory, said data structure including information resident in a database used by said application program and including: a region table comprising geographic information corresponding to a plurality of regions and, for each region of the plurality of regions, an associated WiMAX counter that identifies a number of WiMAX markets located within each corresponding region; a WiMAX coverage table comprising geographic information corresponding to one or more WiMAX markets; a current base station (BS) location; an updated BS location; and a WiMAX camp flag used to indicate whether the dual-mode communications apparatus is operating in the WiMAX mode.

In another embodiment, a method of updating functionality and data stored in a dual-mode WiMAX and CDMA communications device capable of operating in a CDMA mode or a WiMAX mode includes the steps of sending program instruction updates to the dual-mode device over a CDMA communications link from a base station (BS); and sending data updates to the dual-mode device over the CDMA communications link from the BS, wherein the data updates comprise: a plurality of region coordinates corresponding to a plurality of different regions each having an associated WiMAX counter associated therewith, and a plurality of WiMAX market coordinates, wherein each of the plurality of region coordinates and each of the plurality of WiMAX coordinates are represented by associated rectangular areas defined by endpoint coordinates of a diagonal line associated therewith.

BRIEF DISCUSSION OF THE DRAWINGS

Figure 2:
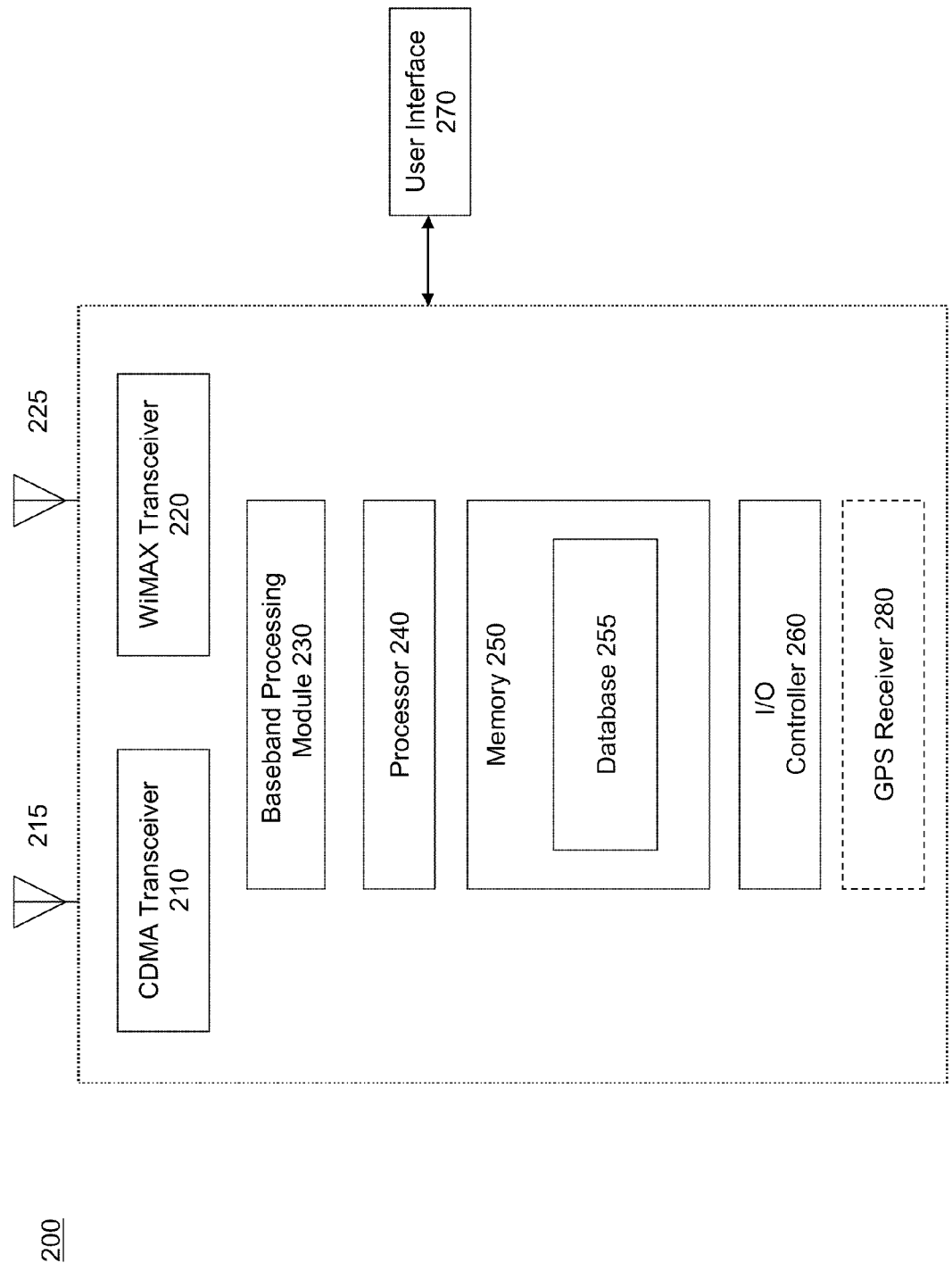
Figure 3:
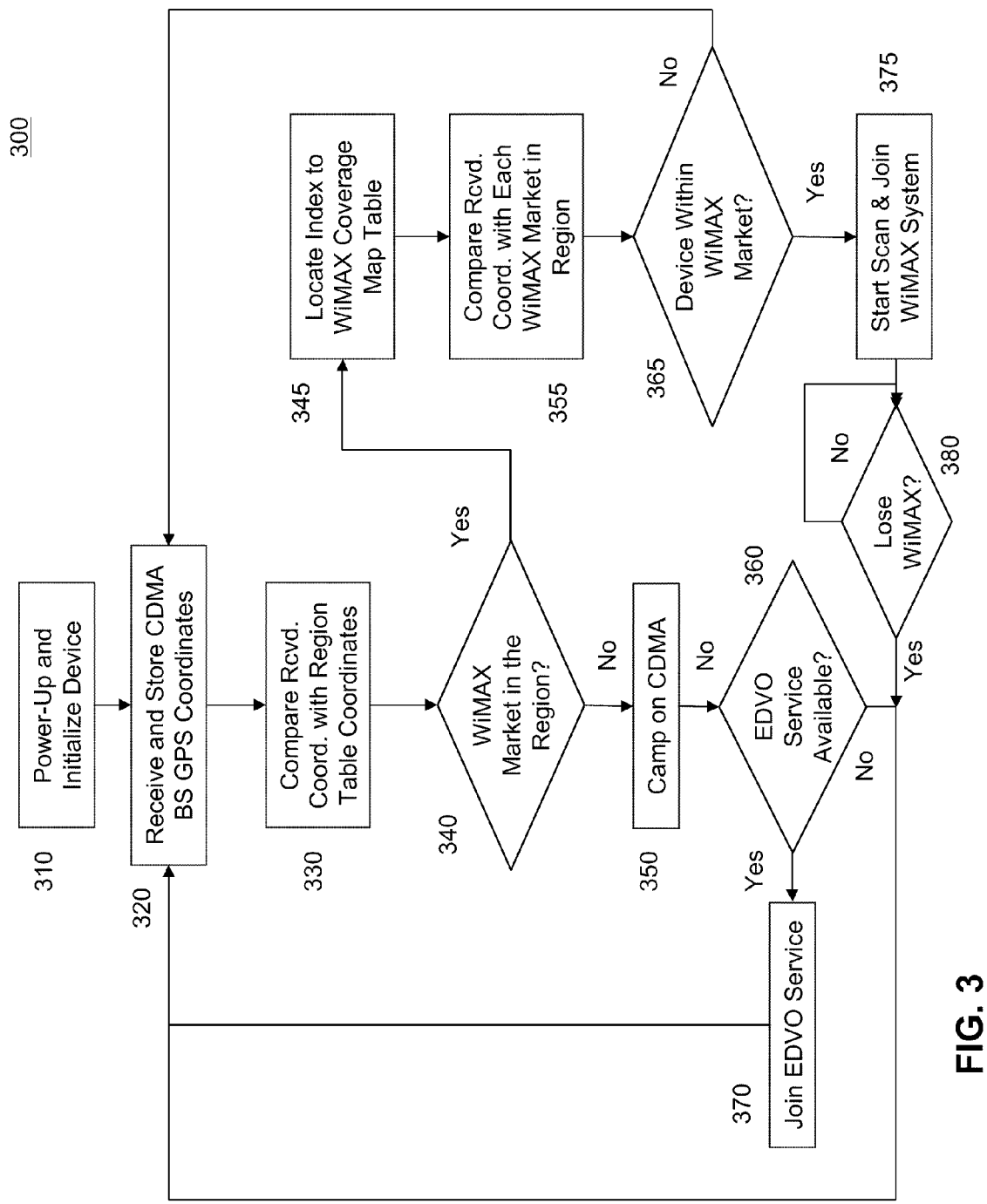
Figure 4:
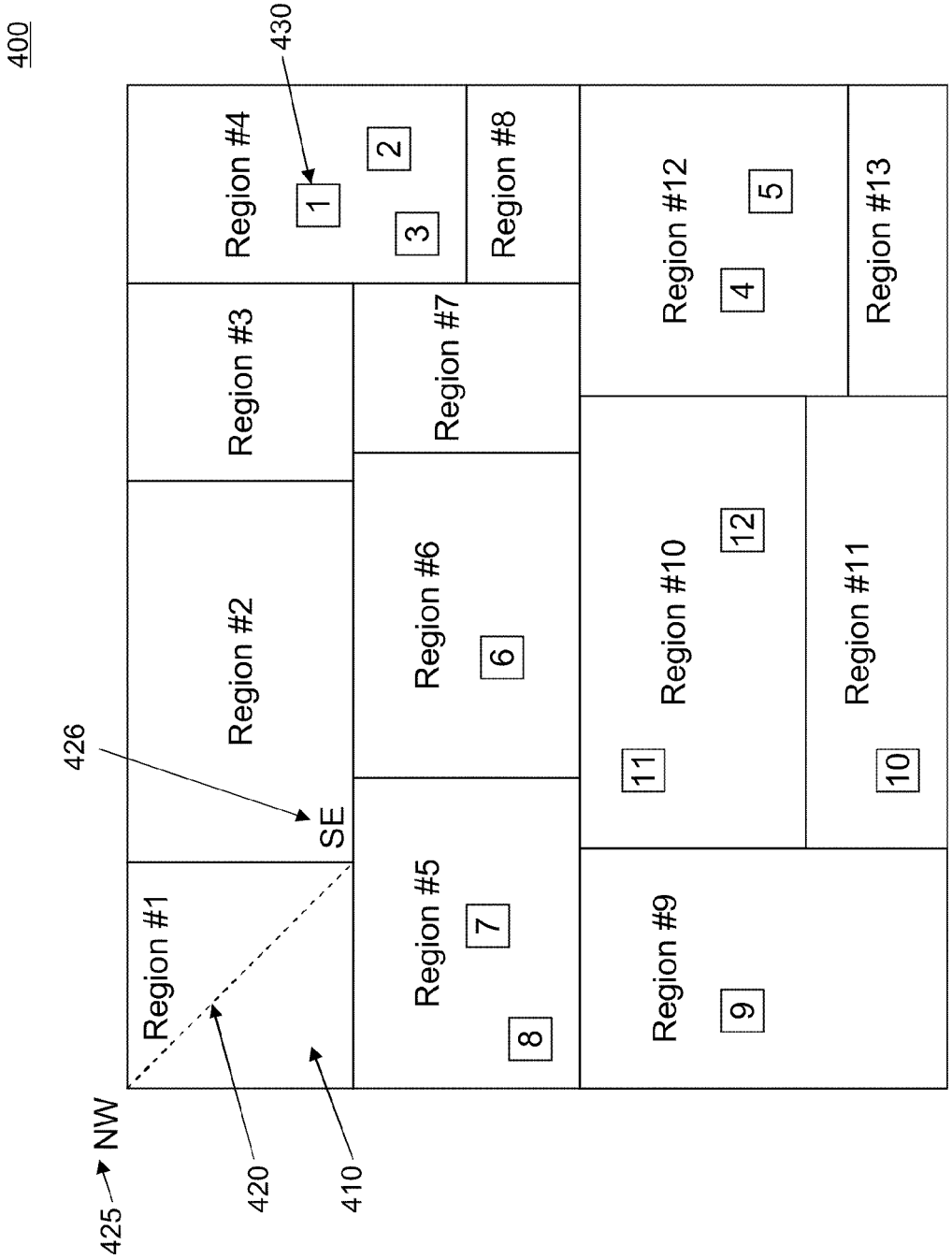

FIG. 1 provides a representation of a network arrangement having dual-mode CDMA/WiMAX devices and a CDMA device operating therein;

FIG. 2 provides a block diagram of an exemplary embodiment of a dual-mode CDMA/WiMAX device of this disclosure;

FIG. 3, provides an exemplary flowchart of a method of an embodiment of this disclosure; and FIG. 4 schematically illustrates a conceptual view of multiple regions and networks pertinent to this disclosure.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of dual-mode CDMA/WiMAX devices may include wireless phone handsets, smart phones, modems, laptop computers with embedded dual-mode functionality, and mobile Internet devices such as used for video streaming, for example.

Those with skill in the art will appreciate that the inventive concept described herein may work with various system configurations. In addition, various embodiments of this disclosure may be made in hardware, firmware, software, or any suitable combination thereof Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

FIG. 1 depicts the architecture of a communications network 100 which may include dual-mode CDMA/WiMAX devices 120a and 120n implemented in accordance with various embodiments of this disclosure. In FIG. 1, base station (BS) 110 may communicate with one or more Mobile Stations/Subscriber Stations (MS/SS) 120a-120n using either CDMA communication links 130a, 130b, and 130n and/or WiMAX communications link 140a and 140n, for example. BS 110 is presumed to be located within a WiMAX market and connected to an associated WiMAX network. In this disclosure, the terms "SS" and "MS" are used interchangeably, although it is recognized that MS implies the use of mobility enhancements. MS/SS 120a-120n may be relatively fixed or immobile terminal equipment, or may be equipment that includes the mobility functions of a MS, e.g., a cell phone or laptop computer traveling in an automobile or airplane. Further, MS/SS 120a and 120n may be implemented as dual-mode CDMA/WiMAX devices capable of either communicating over CDMA communication channels 130a/130n and WiMAX communication channel 140a/140n. In contrast, MS/SS 120b may only be operable in a single mode, i.e., a CDMA mode over CDMA communication channel 130b.

In FIG. 2, an exemplary embodiment of dual-mode CDMA/WiMAX device 200 includes CDMA transceiver 210 operatively connected to antenna 215, and WiMAX transceiver 220, operatively connected to antenna 225. Baseband processing module 230 is configured to convert radio frequency (RF) signals from CDMA transceiver 210 and WiMAX transceiver 220 to baseband signals. Processor 240 may represent one or more processors configured to execute various functionality associated with processing of information received and/or transmitted from antennas 215 and/or 225.

Memory 250 may be configured to store various data and program instructions, and may include structured database 255 configured to store location data that identifies multiple service regions and WiMAX coverage areas by way of area location information, as discussed further below. In addition, various flags and indices may also be stored with appropriate association and linking in the structured database 255. Input/output controller 260 may operate in conjunction with user interface 270 to allow display to a user, for example, as well as input from the user.

Dual-mode device 200 may be pre-provisioned with a WiMAX coverage map table, as illustrated in TABLE I, below. In one or more embodiments, the WiMAX coverage map table includes the Latitude and Longitude of two diagonal points of an imaginary rectangle which encompasses the WiMAX coverage area in each deployed market. Each WiMAX market will have one entry in the table. Regions may be characterized by imaginary rectangles merely for ease of description and determination of location. As would be recognized by a person of ordinary skill in the art, regions may be represented using other representative shapes, with accompanying increases in the level of difficulty in carrying out location-related calculations.

Table I illustrates an exemplary WiMAX coverage map table that includes the longitude and latitude of two diagonal points of an imaginary rectangle which encompasses the WiMAX coverage area in each deployed market and in which each WiMAX market has one table entry. Although northwest (NW) and southeast (SE) corners are depicted as defining the imaginary rectangle, other corners, e.g., northeast and southwest coordinates, may alternatively be used. The use of diagonal coordinates to represent a service area makes it relatively easy to mathematically determine whether a BS location is located within the rectangle. Further, although WiMAX service areas may not be purely rectangular in shape, judicious selection of a rectangle size may be made to appropriately model service availability without reliance upon more complicated geographic shapes.

TABLE I

WiMAX Coverage Map Table

| Index | Lat/Long (NW) | Lat/Long (SE) | WiMAX Market |
|---|---|---|---|
| 1 | NW Lat/Long#1 | SE Lat/Long#1 | Market #1 |
|   | NW Lat/Long#2 | SE Lat/Long#2 | Market #2 |
|   | NW Lat/Long#3 | SE Lat/Long#3 | Market #3 |
| 2 | NW Lat/Long#4 | SE Lat/Long#4 | Market #4 |
|   | NW Lat/Long#5 | SE Lat/Long#5 | Market #5 |
| 3 | NW Lat/Long#6 | SE Lat/Long#6 | Market #6 |
| 4 | NW Lat/Long#7 | SE Lat/Long#7 | Market #7 |
|   | NW Lat/Long#8 | SE Lat/Long#8 | Market #8 |
| 5 | NW Lat/Long#9 | SE Lat/Long#9 | Market #9 |
| 6 | NW Lat/Long#10 | SE Lat/Long#10 | Market #10 |
| 7 | NW Lat/Long#11 | SE Lat/Long#11 | Market #11 |
|   | NW Lat/Long#12 | SE Lat/Long#12 | Market #12 |

Dual-mode device 200 may also be pre-provisioned with a region table in which the entire country may be divided into several regions, and each region may encompass one or more WiMAX markets. Similar to the WiMAX coverage map table, the region table contains the same kind of coordinate information, e.g., GPS coordinate information, but covering a much larger area. In addition, an index is provided for each entry that points to the beginning of a group of entries which are corresponding to each region. A counter may also be provided to track and identify the number of WiMAX markets encompassed by the imaginary rectangle of the region. This counter is used to help eliminate the unnecessary scan if there is no WiMAX market in the region.

Table II below illustrates an exemplary region table in which an entire country or service area is divided into several "rectangularized" regions as illustrated in FIG. 4, and in which each region may encompass one or more WiMAX markets. In Table II, the Coverage Table Index indicates which of the 13 exemplary regions in Table II (and FIG. 4) have associated WiMAX markets. The Counter value indicates how many WiMAX markets are located in each region.

TABLE II

Region Table

| Region No. | Lat/Long (NW) | Lat/Long (SE) | Region Name | WiMAX Network | Coverage Table Index | Counter |
|---|---|---|---|---|---|---|
| 1 | Region Lat/Long#1NW | Region Lat/Long#1SE | Region #1 | No | Nil | 0 |
| 2 | Region Lat/Long#2NW | Region Lat/Long#2SE | Region #2 | No | Nil | 0 |
| 3 | Region Lat/Long#3NW | Region Lat/Long#3SE | Region #3 | No | Nil | 0 |
| 4 | Region Lat/Long#4NW | Region Lat/Long#4SE | Region #4 | Yes | 1 | 3 |
| 5 | Region Lat/Long#5NW | Region Lat/Long#5SE | Region #5 | Yes | 4 | 2 |
| 6 | Region Lat/Long#6NW | Region Lat/Long#6SE | Region #6 | Yes | 3 | 1 |
| 7 | Region Lat/Long#7NW | Region Lat/Long#7SE | Region #7 | No | Nil | 0 |
| 8 | Region Lat/Long#8NW | Region Lat/Long#8SE | Region #8 | No | Nil | 0 |
| 9 | Region Lat/Log#9NW | Region Lat/Long#9SE | Region #9 | No | 5 | 1 |
| 10 | Region Lat/Long#10NW | Region Lat/Long#10SE | Region #10 | No | 7 | 2 |
| 11 | Region Lat/Long#10NW | Region Lat/Long#11SE | Region #11 | No | 6 | 1 |
| 12 | Region Lat/Long#12NW | Region Lat/Long#12SE | Region #12 | Yes | 2 | 2 |
| 13 | Region Lat/Long#13NW | Region Lat/Long#13SE | Region #13 | No | Nil | 0 |

In one embodiment, and while in a CDMA/EVDO coverage area, device 120a or 200 may periodically or even "continuously" receive GPS coordinate information of the serving cell site, i.e., BS 110 through a CDMA overhead broadcast message. Several variables may be used to assist in the process: a) two variables to store the received BS longitude and latitude information, and which are initialized to zero when the device is powered up; and b) two set of variables to store the GPS coordinates of the two corners of the imaginary rectangle that encompasses the region the device is currently located. These two set of variables will also be initialized to zero during power-up; and c) a WiMAX camp variable or "flag" (i.e. "YES" or "NO") to indicate if the dual-mode device camps or remains on the WiMAX system. This variable will be initialized to "NO" at device power-up.

After power-up, device 200 will first search for a WiMAX system. If a WiMAX system is not found, device 200 may start a search for an EVDO system, and then a CDMA system if EVDO is not found. If EVDO system is found, the device will start receiving the GPS coordinate broadcast from the serving cell site, i.e., BS 110. Device 200 may be configured to first determine whether it has already "camped" on the WiMAX system by evaluating the WiMAX Camp Flag stored in memory; device 200 may be further configured to perform this check whenever the GPS coordinate information is received. If "YES", no further action is required. Otherwise, processor 240 will compare the received BS GPS info with the BS GPS coordinate information stored in memory 250.

There are two possible outcomes from the comparison: a) If the received BS GPS information and the BS GPS coordinate information are different, i.e., device 200 has just powered up or has moved to a different cell, device 200 will save the new location information in memory 250. Processor 240 will then check to see if the saved region GPS information is equal to zero, which indicates that device 200 has just powered-up. If zero, device 200 will use the received BS location information, e.g., GPS location information, to compare with the entries in the region table. If the received BS location information falls within one of the regions, device 200 will save the location information of the particular region and retrieve the counter from the entry. The device will first check to see if the counter is zero. If zero, then device 200 will not need to search the WiMAX coverage map table. Otherwise, device 200 will retrieve the index from the entry and use the index to find the corresponding entries in the WiMAX coverage map table. If the received BS location information falls within any imaginary rectangle encompassing a WiMAX market in the region, processor 240 will turn on WiMAX transceiver 220, and start periodically scanning for a WiMAX system. Otherwise, device 200 will not take further action.

If the saved BS location information is non-zero, i.e. saved BS location information exists in memory, processor 240 compares received BS location information with the saved location information of a particular region to determine if the received location coordinates fall within the imaginary rectangle defined by the region coordinates. If the received location is within the same region, processor 240 will check memory 250 to determine if the counter is zero. If yes, then no further action is required. Otherwise, processor 240 will compare received BS location information with the corresponding entries in WiMAX coverage map table. If a WiMAX market is identified, processor 240 will turn on WiMAX transceiver 220 and start scanning for the WiMAX system. If device 200 acquires a WiMAX system, processor 240 may set the WiMAX Camp Flag to "YES". Otherwise, device 200 may periodically scan for a WiMAX system (e.g. every 3 minutes). Otherwise, device 200 will not take further action.

If the device has moved outside a service region, processor 240 may use the received BS location information to compare with the entries in the region table. If the received BS location information falls within one of the regions, then device 200 will save the location information of the new region, retrieve the corresponding index from the entry, and use the index to find the corresponding entries in the WiMAX coverage map table. If the received BS location information falls within any imaginary rectangle encompassing a WiMAX market in the region, processor 240 will turn on WiMAX transceiver 220, and start scanning for a WiMAX system. Otherwise, device 200 will not take further action. If device 200 acquires the WiMAX system, processor 240 may set the WiMAX Camp Flag to "YES". Otherwise, device 200 will periodically scan for a WiMAX system (e.g., every 3 minutes).

If the store BS location information and received BS location information are the same, i.e., device 200 has not move outside the current CDMA cell coverage area, there is then no need to take further action.

FIG. 3 provides an exemplary flowchart of a method of an embodiment. At step 310, dual-mode device 200 is energized and various values stored in database 255 are initialized to "zero", i.e., the current BS location, the location coordinates of a current location, and the index to the corresponding entry in the WiMAX coverage map table. Further, the WiMAX Camp Flag a variable to store current region WiMAX network employment status are initialized to "NO".

At step 320, device 200 receives and stores CDMA BS coordinates, e.g., GPS coordinates, in memory 250. These received coordinates are compared with Region Table Coordinates stored in memory 250. Based upon this comparison, step 340 determines whether a WiMAX market is in the current region. If "YES", step 345 locates the index to the WiMAX Coverage Table, and step 355 compares the received BS location coordinate with each WiMAX market in the current region. If dual-mode device 200 is determined to be within a WiMAX market area at step 365, the WiMAX transceiver 220 is turned on and joins the WiMAX system at step 375. If not within a WiMAX market area, device 200 maintains the CDMA service and the process returns to step 320 in which updated CDMA BS coordinates are received. After joining the WiMAX network at step 375, step 380 determines if the WiMAX connection has been lost. If "YES", process 300 returns to step 320 in which updated CDMA BS coordinates are received. If "NO", process 300 loops back to step 380 to periodically check to determine that the WiMAX connection is being maintained. If step 340 determines that a WiMAX market is not in the region, then device 200 "camps" on the CDMA connection at step 350. Step 360 determines whether EDVO service is available in lieu of WiMAX service. If "YES", dual-mode device 200 joins the EDVO service using the CDMA network connection at step 370, and then returns to step 320 in which updated CDMA BS coordinates are received. If EDVO service is not available at step 360, the process returns to step 320 in which updated CDMA BS coordinates are received.

FIG. 4 depicts conceptual view 400 of regions and networks and related WiMAX services. Each of 13 exemplary regions in FIG. 4 is represented as a rectangle, e.g., rectangle 410 represents Region #1. Diagonal line 420 is used to characterize rectangle 410. Similar diagonal lines may be used for each of the 12 remaining rectangles in FIG. 4. Northwest endpoint 425 and southeast endpoint 426 are used to characterize the location of diagonal 420 by the use of corresponding latitude/longitude coordinates stored in memory 250.

Further, Region #4, for example, includes WiMAX markets 1, 2, and 3 located therein. WiMAX market 1 is represented by rectangle 430 having a corresponding diagonal (not shown) with location coordinates stored in memory 250 similar to those for each Region 1-13. WiMAX markets 4-12 are spread across the remaining regions as depicted in FIG. 4.

In another embodiment, dual-mode device 200 includes optional GPS receiver 280. Current dual-mode CDMA/WiMAX devices may not routinely incorporate a GPS receiver, but such functionality may be used in a method of operating a dual-mode WiMAX and CDMA communications device by receiving a current device position from the GPS receiver, and using this current position to determine a particular region of the plurality of different regions in which the dual-mode device is currently located, and whether WiMAX services are available in a similar fashion to the previously discussed embodiment.

In another embodiment, a method of updating functionality and data stored in a dual-mode WiMAX and CDMA communications device capable of operating in a CDMA mode or a WiMAX mode is provided. Functionality of dual-mode device 200 may be upgraded by connection to a computer, e.g., a server, or by an over-the-air connection to a base station using a CDMA communications network, for example. Data in the Region and WiMAX Coverage Map Tables may be updated to include different regions, different diagonal location coordinates, or different shapes of existing regions, and may also be updated to include new WiMAX market areas. With this method, conventional dual-mode devices may be upgraded to include the novel and non-obvious functionality of the present disclosure.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of operating a dual-mode communications device capable of operating in a first mode corresponding to a first type network or a second mode corresponding to a second type network different from the first type network, the method comprising:

receiving, in the dual-mode device, a first base station (BS) location message via the first type network from a first BS, and storing a first BS location in the first BS location message as a current BS location in a memory device operatively coupled to a processor arranged in the dual-mode device;

comparing, using the processor, the stored first BS location to a plurality of region coordinates stored in the memory device and corresponding to a plurality of different regions;

storing pre-determined geographical coordinates defining locations of one or more markets for the second type network in a region table in a database;

using the comparison result to determine a particular region of the plurality of different regions in which the dual-mode device is currently located;

comparing, using the processor, the stored pre-determined geographical coordinates of the locations of the one or more markets for the second type network with the region coordinates of the particular region of the plurality of different regions in which the dual-mode device is currently located;

if the location of no market of the second type network is geographically located within the particular region, operating the dual-mode device in the first mode; and if the location of at least one of the one or more markets of the second type network is geographically located within the particular region, determining whether the stored first BS location is geographically located within a coverage area of the at least one of the one or more markets for the second type network and, in response to said determination, either placing the dual-mode device in a second mode of operation or placing the dual-mode device in the first mode.

2. The method of claim 1, further comprising updating the stored current BS location in the memory device responsive to receiving a second BS location message from a second BS different from the first BS.

3. The method of claim 2, wherein said updating is carried out periodically via continuous reception of coordinate information from a serving BS via a first mode overhead broadcast message.

4. The method of claim 2, further comprising using the updated current BS location to determine whether the dual-mode device is operating in a region different than the particular region, wherein, if so, the method further comprises:
determining, using the processor, whether a different market for the second type network is located within the different region, wherein, if no markets for the second type network are located within the different region, operating the dual-mode device in the first mode,
wherein, if the second BS is located within the different market for the second type network, turning on a second mode transceiver in the dual-mode device and joining a second type network located therein.

5. The method of claim 1, wherein, if the dual-mode device is placed in the second mode of operation, the processor controls a second mode transceiver arranged in the dual-mode device to be placed in an ON condition.

6. The method of claim 1, wherein, if the dual-mode device is not in the second mode of operation, the processor controls a second mode transceiver arranged in the dual-mode device to be maintained in an OFF condition until the dual-mode device is located within said one of the one or more markets for the second type network.

7. The method of claim 1, further comprising conserving a battery charge of the dual-mode device by maintaining a second mode transceiver arranged therein in an OFF condition until the dual-mode device is located within a market for the second type network.

8. The method of claim 7, further comprising placing the second mode transceiver in an ON condition only when the dual-mode device is located within the market for the second type network.

9. The method of claim 1, further comprising initializing the current BS location to zero in the memory device upon initial power-up of the dual-mode device and before said receiving the first base station (BS) location message.

10. The method of claim 1, wherein said storing the first BS location as the current BS location in the memory device comprises storing a latitude and longitude corresponding to the first BS location.

11. The method of claim 1, wherein the one or more markets for the second type network are represented by a different rectangular-shaped area, wherein second type network market coordinates are stored in the memory device and are each represented by an associated diagonal line of an associated rectangular-shaped area.

12. The method of claim 1, wherein said determining whether one or more markets for the second type network are located within the particular region comprises evaluating a second type network counter value stored in a database in the memory device and associated with the particular region and, if said second type network counter value is non-zero, searching a second type network coverage map table stored in the database.

13. The method of claim 1, wherein, if no markets for the second type network are located within the particular region, the dual-mode device is operated in the first mode, and the method further comprises determining whether a third type network service is available and, if available, joining the third type network service.

14. The method of claim 13, wherein the third type network service is an Evolution Data Only (EDVO) service type.

15. The method of claim 1, wherein the first mode is a Code Division Multiple Access (CDMA) mode.

16. The method of claim 1, wherein the second mode is a Worldwide Interoperability for Microwave Access (WiMAX) mode.

17. The method of claim 1, wherein, responsive to being outside the second type network markets, a decision to not operate the dual mode communications device in the second mode conserves a battery charge of a device battery.

18. A method of operating a dual-mode communications device capable of operating in a first mode corresponding to a first type network or a second mode corresponding to a second type network different from the first type network, the method comprising:
receiving, in the dual-mode device, a first base station (BS) location message via the first type network from a first BS, and storing a first BS location in the first BS location message as a current BS location in a memory device operatively coupled to a processor arranged in the dual-mode device;
comparing, using the processor, the stored first BS location to a plurality of region coordinates stored in the memory device and corresponding to a plurality of different regions;
using the comparison result to determine a particular region of the plurality of different regions in which the dual-mode device is currently located;
determining, using the processor, whether a location of any of one or more markets for the second type network is geographically located within the particular region based on pre-determined geographical coordinates defining locations and coverage areas of the one or more markets for the second type network;
if the location of no market of the second type network is geographically located within the particular region, operating the dual-mode device in the first mode; and
if the location of at least one of the one or more markets of the second type network is geographically located within the particular region, determining whether the stored first BS location is geographically located within the coverage area of the at least one of the one or more markets for the second type network and, in response to said determination, either placing the dual-mode device in a second mode of operation or placing the dual-mode device in the first mode,
wherein each of the plurality of different regions is represented by a different rectangular-shaped area, wherein the plurality of region coordinates stored in the memory device are each represented by an associated diagonal line of an associated rectangular-shaped area.

19. The method of claim 18, wherein said processor determines whether the stored first BS location is within the associated rectangular-shaped area by using coordinates of the associated diagonal line.

20. The method of claim 18, wherein each associated diagonal line is represented by a first latitude and longitude corresponding to a first corner of the rectangular-shaped area and a second latitude and longitude corresponding to a second corner of the rectangular-shaped area diagonally opposed to the first corner.

21. The method of claim 20, wherein, for each of the plurality of different regions, the associated first latitude and longitude and the associated second latitude and longitude are stored in a database arranged in the memory device.

22. A dual-mode communications apparatus capable of selectively operating in a first type network mode in a first type network or a second type network mode in a second type network different from the first type network, the apparatus comprising:
- a processor;
- a memory device configured to store a region table comprising geographic information corresponding to a plurality of regions, a second type network coverage table comprising geographic information defining locations of one or more second type network markets, and a current base station (BS) location therein;
- a first mode transceiver configured to transmit and receive information over a first type network; and
- a second mode transceiver configured to selectively transmit and receive data over a second type network;
- wherein the processor is configured to:
  - receive and compare the current BS location with an updated BS location received over the first type network and, in response to said comparison, to determine a particular region in the plurality of regions in which the apparatus is currently operating,
  - determine whether a location of at least one of the one or more second type network markets is geographically located within the particular region,
  - if the location of the at least one of the one or more second type network markets is geographically located within the particular region, determine whether the apparatus is currently operating within a coverage area of the at least one of the one or more second type network markets, and
- if the apparatus is currently operating within the coverage area of said at least one of the one or more second type network markets, cause the second mode transceiver to transmit and join a second type network associated therewith.

23. The dual-mode communications apparatus of claim 22, wherein the processor is further configured to cause the second type transceiver to be maintained in an "OFF" condition unless the processor determines that the apparatus is operating in said at least one of the one or more second type network markets, said determination being made by comparing the current BS location to geographic information stored in the second type network coverage table.

24. The dual-mode communications apparatus of claim 23, wherein, responsive to the processor determining that the apparatus is operating in said at least one of the one or more second type network markets, the processor is further configured to cause the second type transceiver to transition to an "ON" condition.

25. The dual-mode communications apparatus of claim 24, wherein, responsive to the processor determining that the apparatus is no longer operating in said at least one of the one or more second type network markets, the processor is further configured to cause the second mode transceiver to transition to the "OFF" condition.

26. The dual-mode communications apparatus of claim 24, wherein said processor and said transceiver are configured to transmit and to scan for and join a second type network when said transceiver is in said "ON" condition.

27. The dual-mode communications apparatus of claim 22, wherein the current BS location is received by the first mode transceiver via a periodic first type overhead broadcast message.

28. The dual-mode communications apparatus of claim 22, further comprising a battery operatively coupled to the processor, the CDMA transceiver, and the second mode transceiver,
- wherein the processor is further configured to conserve a battery charge of the battery by maintaining the second mode transceiver in an OFF condition unless the processor determines that the current BS is located within said at least one of the one or more second type network markets.

29. The dual-mode communications apparatus of claim 22, wherein the processor is further configured during execution of a power-on sequence to initialize the current BS location to zero in the memory device.

30. The dual-mode communications apparatus of claim 22, wherein the processor is further configured to maintain the second mode transceiver in a current operating state if the updated BS location received over the first type network has not changed from the current BS location stored in the memory device.

31. The dual-mode communications apparatus of claim 30, wherein the processor is further configured to evaluate whether to change the second mode transceiver to a different operating state if the updated BS location received over the first type network is different than the current BS location stored in the memory device.

32. The dual-mode communications apparatus of claim 22, wherein if the apparatus is not currently operating within said at least one of the one or more second type network markets, the processor is further configured to cause the first mode transceiver to transmit and maintain communications over the first type network and to transition the second mode transceiver to an OFF condition.

33. The dual-mode communications apparatus of claim 32, wherein when the apparatus is not currently operating within said at least one of the one or more second type network markets, the processor is further configured to determine whether a third type network service is available, and, if the third type network service is available, to join the third type network service and to enable communications by the apparatus therewith.

34. The dual-mode communications apparatus of claim 33, wherein the third type network service is an Evolution Data Only (EDVO) service type.

35. The dual-mode communications apparatus of claim 22, wherein the first mode is a Code Division Multiple Access (CDMA) mode.

36. The dual-mode communications apparatus of claim 22, wherein the second mode is a Worldwide Interoperability for Microwave Access (WiMAX) mode.

37. A dual-mode communications apparatus capable of selectively operating in a first type network mode in a first type network or a second type network mode in a second type network different from the first type network, the apparatus comprising:
- a processor;
- a memory device configured to store a region table comprising geographic information corresponding to a plurality of regions, a second type network coverage table comprising geographic information defining locations and coverage areas of one or more second type network markets, and a current base station (BS) location therein;
a first mode transceiver configured to transmit and receive information over a first type network;
a second mode transceiver configured to selectively transmit and receive data over a second type network; and
wherein the processor is configured to:
receive and compare the current BS location with an updated BS location received over the first type network and, in response to said comparison, to determine a particular region in the plurality of regions in which the apparatus is currently operating,
determine whether a location of at least one of the one or more second type network markets is geographically located within the particular region,
if the location of the at least one of the one or more second type network markets is geographically located within the particular region, determine whether the apparatus is currently operating within the coverage area of the at least one of the one or more second type network markets, and
if the apparatus is currently operating within the coverage area of said at least one of the one or more second type network markets, to cause the second mode transceiver to transmit and join a second type network associated therewith,
wherein the memory device is configured to store the geographic information corresponding to the plurality of regions in the region table, and the geographic information defining locations of the one or more second type network markets in the second type network coverage table as a plurality of data entries each representing an associated rectangular area.

38. The dual-mode communications apparatus of claim 37, wherein each of the associated rectangular areas is represented by a different diagonal line.

39. The dual-mode communications apparatus of claim 38, wherein each different diagonal line is represented by a first latitude and longitude corresponding to a first corner of the associated rectangular-shaped area, and a second latitude and longitude corresponding to a second corner of the associated rectangular-shaped area diagonally opposed to the first corner.

40. The dual-mode communications apparatus of claim 38, wherein said processor determines a current operating region by comparing the current BS location with coordinates of diagonal lines stored in the memory device.

41. The dual-mode communications apparatus of claim 40, wherein said processor determines whether a second type network market is encompassed within the current operating region by evaluating a second type network index value associated with the current operating region.

42. The dual-mode communications apparatus of claim 41, wherein said processor determines that the current operating region encompasses a second type network market if the second type network index value associated with the current operating region has a non-zero value.

43. The dual-mode communications apparatus of claim 41, wherein said processor determines whether the current BS location is within a second type network market by comparing the current BS location with coordinates of diagonal lines associated with the second type network market and stored in the memory device.

44. A non-transitory computer-readable storage medium comprising computer readable code embodied thereon which, when executed by a processor arranged in a dual-mode communications device capable of operating in a first mode corresponding to a first type network or a second mode corresponding to a second type network different from the first type network, causes the processor to carry out a plurality of operations comprising:
receiving, in the dual-mode device, a first base station (BS) location message via the first type network from a first BS, and storing a first BS location in the first BS location message as a current BS location in a memory device;
storing pre-determined geographical coordinates defining locations of one or more markets for the second type network in a region table in a database;
comparing the stored first BS location to a plurality of region coordinates stored in the memory device and corresponding to a plurality of different regions;
using the comparison result to determine a particular region of the plurality of different regions in which the dual-mode device is currently located;
determining whether the location of any of the one or more second type network markets is geographically located within the particular region by using the stored pre-determined geographical coordinates;
if the location of no market of the second type network is geographically located within the particular region, operating the dual-mode device in the first mode; and
if the location of at least one of the one or more markets of the second type network is geographically located within the particular region, determining whether the stored first BS location is geographically located within a coverage area of the at least one of the one or more second type network markets and, in response to said determination, either placing the dual-mode device in a second mode of operation or placing the dual-mode device in the first mode.

45. The non-transitory computer-readable storage medium of claim 44, wherein the first mode is a Code Division Multiple Access (CDMA) mode.

46. The non-transitory computer-readable storage medium of claim 44, wherein the second mode is a Worldwide Interoperability for Microwave Access (WiMAX) mode.

47. A method of operating a dual-mode communications device capable of operating in a first mode corresponding to a first type network or a second mode corresponding to a second type network different from the first type network, the method comprising:
receiving, in a processor, a device position from a GPS receiver arranged in the dual-mode communications device;
storing pre-determined geographical coordinates defining locations and coverage areas of one or more markets for the second type network in a region table in a database;
comparing the received device position with a plurality of region coordinates stored in a memory device operatively coupled to the processor and corresponding to a plurality of different regions;
using the comparison result to determine a particular region of the plurality of different regions in which the dual-mode device is currently located;
determining, using the processor and the stored pre-determined geographical coordinates, whether the location of any of the one or more second type network markets is geographically located within the particular region;
if the location of no market of the second type network is geographically located within the particular region, operating the dual-mode device in the first mode; and
if the location of at least one of the one or more second type network markets is geographically located within the particular region, determining whether the received device position is geographically located within the coverage area of the at least one of the one or more second type network markets and, in response to said determination, either placing the dual-mode device in a second mode of operation or placing the dual-mode device in the first mode.

48. The method of claim 47, wherein the first mode is a Code Division Multiple Access (CDMA) mode.

49. The method of claim 47, wherein the second mode is a Worldwide Interoperability for Microwave Access (WiMAX) mode.

50. A memory for storing data for access by an application program being executed by a processor in a dual-mode communications apparatus capable of selectively operating in a first mode in a first type network or a second mode in a second type network different from the first type network, the memory comprising:
a data structure stored in said memory, said data structure including information resident in a database used by said application program and including:
a region table comprising geographic information corresponding to a plurality of regions and, for each region of the plurality of regions, an associated second type counter that identifies a number of second type network markets located within each corresponding region;
a second type network coverage table comprising geographic information defining locations of one or more second type network markets in terms of a diagonal line of a certain geometrical representation of a corresponding second type network market;
a current base station (BS) location; and
an updated BS location,
wherein said application program is configured to compare the current BS location to the geographic information corresponding to the plurality of regions to determine a particular region of the plurality of regions in which the dual-mode communications apparatus is currently located, and compare the geographic information defining the locations of the one or more second type network markets with the geographic information of the particular region to determine whether a second type network market is geographically located within the particular region.

51. The memory of claim 50, wherein the geographic information for each of the plurality of regions is included in the data structure as latitude and longitude coordinates that define a diagonal line of an associated rectangular-shaped area.

52. The memory of claim 50, wherein the geographic information corresponding to the one or more second type network markets is included in the data structure as associated latitude and longitude coordinates that define a diagonal line of a rectangular representation of a second type network market.

53. The memory of claim 50, wherein the first mode is a Code Division Multiple Access (CDMA) mode.

54. The memory of claim 50, wherein the second mode is a Worldwide Interoperability for Microwave Access (WiMAX) mode.

55. A method of updating functionality and data stored in a dual-mode communications device capable of operating in a first network mode or a second network mode different from the first network mode, the method comprising:
sending program instruction updates to the dual-mode device over a first type communications link from a base station (BS); and
sending data updates to the dual-mode device over the first type communications link from the BS, wherein the data updates comprise:
a plurality of region coordinates corresponding to a plurality of different regions each having an associated second type counter associated therewith, and
a plurality of second type network market geographical coordinates defining locations of one or more second type network markets,
wherein each of the plurality of region coordinates and each of the plurality of second type network geographical coordinates are represented by associated rectangular areas defined by endpoint coordinates of a diagonal line associated therewith,
wherein the dual-mode communications device is configured to compare the plurality of second type network geographical coordinates defining the locations of the one or more second type network markets with the region coordinates of a particular region of the plurality of different regions in which the dual-mode communications device is currently located to determine whether a second type network market is geographically located within the particular region.

* * * * *